US006659896B1

(12) United States Patent
Stief et al.

(10) Patent No.: US 6,659,896 B1
(45) Date of Patent: Dec. 9, 2003

(54) TENSIONING DEVICE FOR TRACTION MEANS

(75) Inventors: Hermann Stief, Rosstal/Buchschwabach (DE); Josef Miko, Emskirchen (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 09/936,395

(22) PCT Filed: Feb. 18, 2000

(86) PCT No.: PCT/EP00/01322

§ 371 (c)(1),
(2), (4) Date: May 8, 2002

(87) PCT Pub. No.: WO00/53955

PCT Pub. Date: Sep. 14, 2000

(30) Foreign Application Priority Data

Mar. 11, 1999 (DE) .......................... 199 10 828

(51) Int. Cl.⁷ .............................. F16H 7/12; F16H 7/10
(52) U.S. Cl. ........................................ 474/135; 474/112
(58) Field of Search .......................... 474/135, 133, 474/136, 117, 101, 112

(56) References Cited

U.S. PATENT DOCUMENTS

| 4,832,665 A | | 5/1989 | Kadota et al. | |
| 4,934,987 A | * | 6/1990 | Kadota et al. | 474/135 |
| 5,244,438 A | | 9/1993 | Golovatai-Schmidt | |
| 5,370,586 A | * | 12/1994 | Thomsen et al. | 474/135 |
| 5,470,279 A | | 11/1995 | Bran | |
| 5,919,107 A | * | 7/1999 | Stepniak | 474/112 |
| 6,375,588 B1 | * | 4/2002 | Frankowski et al. | 474/101 |
| 6,416,435 B1 | * | 7/2002 | Szatkowski et al. | 474/135 |

FOREIGN PATENT DOCUMENTS

| CH | 681910 A5 | 8/1992 |
| DE | 4015028 A1 | 1/1992 |
| DE | 4209914 A1 | 9/1993 |
| DE | 9300178 C1 | 4/1994 |
| DE | 4439834 A1 | 6/1995 |
| DE | 19752046 A1 | 5/1998 |
| EP | 0456142 A1 | 5/1991 |
| EP | 0826906 A2 | 8/1997 |

* cited by examiner

Primary Examiner—Marcus Charles
(74) Attorney, Agent, or Firm—Volpe and Koenig, P.C.

(57) ABSTRACT

A tensioning device for traction means, especially for toothed belts, is provided with a tensioning arm (3) on which a tensioning roller (1) is rotatably arranged. Furthermore a stopper (12) is provided which restricts a swiveling angle of the tensioning arm (3), whereby a detachable locking device (15) is provided through which the tensioning arm (30) and the stopper (12) are locked for joint swiveling into a position provided for the stopper (12).

13 Claims, 1 Drawing Sheet

TENSIONING DEVICE FOR TRACTION MEANS

BACKGROUND

1. Field of the Invention

The present invention concerns a tensioning device for traction means, especially toothed belts, as they are used, for example, in toothed belt drives of motor vehicles. The present invention furthermore concerns a process for installation of, in particular, a prestressed tensioning device for traction means.

2. Description of Related Art

From U.S. Pat. No. 4,832,665, for example, a tensioning device for toothed belts is known where a tensioning roller is pivoted on an eccentric. The eccentric is arranged pivotably on a carrier which is flange-mounted on a motor by means of a screw. A spiral spring arranged on the eccentric is supported on the one hand on the motor and on the other on the eccentric such that the eccentric with the tensioning roller is sprung against the toothed belt. With this tensioning device, a locking pin is provided which keeps the tension spring in a prestressed arrangement prior to starting up. After flange-mounting the tensioning device to the motor, the locking pin is withdrawn so that the eccentric is sprung under the force of the tension spring against the toothed belt. The toothed belt can wind around the toothed drive pulleys of the crank shaft and the camshafts. It is important that a jumping of the toothed belt over the teeth of the toothed drive pulleys is prevented, since otherwise the control times are altered in an undesirable manner so that a total failure of the internal combustion machine can result. In order to avoid a jumping of the toothed belt, with the tensioning device in accordance with U.S. Pat. No. 4,832,665, a freewheel is arranged between the bolt mentioned and the eccentric. When in the strand of the toothed belt, with which the tensioning roller interacts, excessively high strand tension arises, the eccentric is swivelled against the force of the tension spring. The grip roller freewheel engages in this direction so that an undesirably high deflection of the eccentric out of the belt drive is prevented. As soon as excessively high strand tension has built up, the tensioning roller exerts spring force against the toothed belt so that the required tension is maintained in the strand. In this way, a jumping of the toothed belt is avoided. The freewheel accordingly here takes over the function of a stopper which restricts the swivelling angle of the tensioning arm. With this tensioning device, the expensive construction of the stopper is nonetheless disadvantageous, which requires the freewheel as well as a damping fluid in order to make possible a deflection of the eccentric out of the belt drive.

A so-called double eccentric tensioner is known from DE 40 15 028 A1 which includes an adjusting eccentric and a working eccentric. During installation on the motor block, the tensioning device is at first loosely screwed with bolts passed through an eccentrically arranged fastening bore hole. The tensioning device is swung against the belt with an adjusting tool inserted into a hexagonal recess. When this is stressed, a reaction force acts upon the tensioning device. With further swivelling, the spiral spring is stressed and the installation tool swivelled. The swivelling process is continued until notches provided on the flange and a plastic disk are covered. In this situation, a projection is situated in the middle of a recess of the swivelling area of the tensioning arm. The bolt is screwed fast in this presetting. These double eccentric strainers have the disadvantage that when the adjusting eccentric is swivelled too far for the presetting, the one notch wanders past the other notch. If now the adjusting eccentric is swivelled back until the two notches are aligned with each other, the projection is no longer situated in the center of the recess mentioned, but rather somewhat displaced from it. The reason for this displacement is an internal friction which arises between the machine parts during presetting. In this case, the stopper which is formed by the projection and the recess, has another position so that the swivelling region of the tensioning arm is altered. A hysteresis effect takes place. In practice, this can lead to considerable problems, since first strand tension forces deviate from their predetermined values and secondly because the swivelling range is no longer adjusted to the behavior of the traction means drive.

SUMMARY

The object of the present invention is therefore to provide a tensioning device which is simply constructed and the starting of which is reliably possible.

With the invention, a tensioning device for traction means, especially a toothed belt, is proposed which is provided with a tensioning arm on which a tensioning roller is rotably arranged, and which is furthermore provided with a stopper which restricts a pivoting angle of the tensioning arm, whereby a detachable locking device is provided by which the tensioning arm and the stopper are locked into a position provided for the stopper for joint swiveling.

With the tensioning device of the invention, additional machine elements, as for example free wheels, can be dispensed with. Furthermore, it is assured that any friction possibly arising between parts to be adjusted has no influence on the trouble-free position of the stopper, because due to the locking, no relative motion between tensioning arm and stopper takes place during installation. If the tensioning device is installed in a toothed belt drive, a tension spring can press the tensioning arm against the toothed belt, whereby the tensioning arm swivels together with the stopper. This swiveling motion ends when an equilibrium of forces between strand tension, the force of friction and tension spring force is established. In this situation, the stopper is fixed, and the locking described is relieved so that a further operation-conditioned swiveling of the tensioning arm takes place independently of the stopper. The position of the stopper is now coordinated with the toothed belt drive. Faulty adjustments, especially due to the hysteresis effect, are ruled out because the stopper is only swivelled in the direction of the belt, and because the stopper is moved together with the tensioning arm.

The tensioning arm and the stopper can both be provided in any given case with at least one arrangement which are provided for striking against each other, whereby the arrangements are set at a distance from each other if the tensioning arm and the stopper are locked with each other. This distance is precisely dimensioned such that after installing the tensioning device, the swiveling angle of the tensioning arm is brought out of its middle position (which at least generally agrees with the position after concluding installation) and against the tensioning force of the tension spring on the toothed belt drive. If the excessive strand tension causes a strong deflection of the tensioning arm against the spring force of the tension spring as a consequence, this deflection is stopped in time by the stopper or by the striking of the arrangements on each other. As soon as the strand tension has diminished, the tensioning arm immediately springs under the spring force of the tension spring against the toothed belt so that a jumping of the toothed belt is reliably prevented.

An especially simple and economical tensioning device provides that the tensioning arm is pivotably located on a carrier, whereby a tension spring is supported on the one side on the carrier and on the other on the tensioning arm. This arrangement makes a prestressing of the tension spring possible. If the tensioning arm, the stopper and the carrier are lockable with each other by means of the locking device, the following advantages result: First the locking can take place in an arrangement in which the tension spring is prestressed, and secondly a defined angle between stopper and tensioning arm can already be adjusted in advance.

An especially simple locking device provides a pin which engages for locking in openings of the elements to be locked whereby the pin can be brought out of engagement with the openings. In the simplest case, the tensioning arm, the stopper and the carrier can each be provided in any given case with holes which are aligned with each other, whereby the pin is passed through the holes. If the tensioning device in installed in the toothed belt drive, the pin first merely needs to be withdrawn out of the carrier, the stopper is then fixed and finally the pin completely withdrawn so that starting the tensioning device of the invention can take place without further steps.

The carrier can include a base plate which is provided with a shaft on which the tensioning arm is pivoted. Such an arrangement is chiefly appropriate when the base plate is to be adapted to the contour of the flange surface of the motor. The shaft and the base plate are preferably connected fast with each other.

The already mentioned stopper can be formed in an especially simple manner by a disk which is rotable in relation to the shaft. The capacity of the disk of being rotatable in relation to the shaft is necessary in order to guarantee that the tensioning arm and the disk can only swivel together until the equilibrium of forces between strand tension and tension spring force is adjusted. After this, the disk can be fixed friction-locking to the shaft.

With this arrangement, the tension spring can be formed by a helical tension spring which is arranged on the shaft. The helical spring is then supported on the one hand on the carrier and on the other on the tensioning arm constructed as an eccentric.

With a preferred refinement of the invention, the locking device provides a pin which engages in openings of the disk and the eccentric and the carrier. With this tensioning device, the position of the disk in relation to the eccentric is established as a consequence of locking, whereby moreover the helical spring can be prestressed. For the helical spring is on the one hand supported on the carrier and on the other hand on the eccentric, and since these two elements are locked by means of the pin, the helical spring cannot relax.

The already mentioned fastening of the disk on the shaft preferably takes place by means of a screw which engages into a hole provided through the shaft whereby the disk is pressed on the shaft and connected friction-locking with this when the screw is tightened.

This tensioning device can be advantageously refined in that the screw is passed through the hole executed as a central longitudinal hole and is screwed together with a frame-fast machine element, especially the motor block. Accordingly, this screw serves a double purpose, namely first to fasten the tensioning device on the motor block and second to fasten the disk on the shaft.

The tensioning device described can be suited in an especially favorable manner for the following process for placing the tensioning device into operation. The tensioning device provided for this process described below has the following features: A tensioning arm on which a tensioning roller is pivoted; a support on which the tension arm is pivotably located; a tension spring which on the one hand is supported on the carrier and on the other on the tensioning arm; a stopper which restricts the swiveling angle of the tensioning arm; a detachable locking device by means of which the tensioning arm and the support and the stopper can be locked with each other. The process provides the following steps: locking the tensioning arm and the carrier with each other in an arrangement in which the tension spring is prestressed. This thus preassembled tensioning facility is incorporated in the traction means drive, and the belt is laid on the tensioning roller. After this, the locking described is partially relieved such that only the stopper and the tensioning arm remain locked by means of the locking device, whereby the tensioning arm is sprung together with the stopper against the traction means under the force of the prestressed tension spring. Now the stopper is fastened. Subsequent to this, the locking is completely relieved so that the tensioning arm is pivotable relative to the stopper. The stopper now has an optimal position. The swiveling angle of the tensioning arm up to catching on the stopper now present is, on the basis of its amount, approximately as large as with the preassembled tensioning device. For with the preassembled tensioning device, this swiveling angle is established by the locking of tensioning arm and stopper with each other, whereby the stopper is fixed following joint swiveling of tensioning arm and stopper.

BRIEF DESCRIPTION OF THE DRAWINGS

The invention is described in greater detail below on the basis of a preferred embodiment shown in the drawings, wherein.

DETAILED DESCRIPTION OF THE PREFERRED EMBODIMENTS

Figure 1:
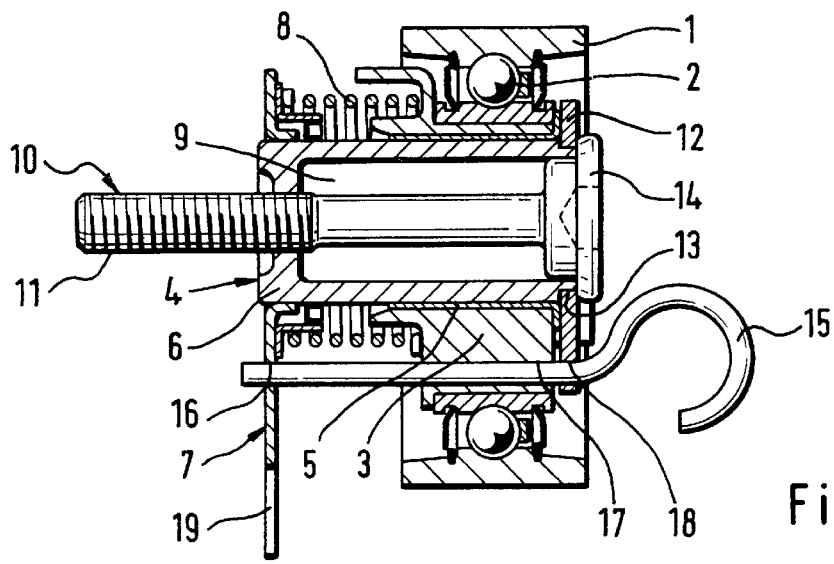
FIG. 1 is a longitudinal section through the tensioning device of the invention.

With the tensioning device of the invention according to FIG. 1, a tensioning roller 1 is rotatably supported on a ball bearing 2 located on an eccentric 3. The eccentric 3 is pivoted on a support 4 through an interposed sleeve bearing 5. The support 4 includes a cylindrical shaft 6 and a base plate 7 which is arranged on one end of the shaft 6 and is joined fast with this. The base plate 7 serves for installation and as an anti-rotation element of the tensioning device in relation to a motor block (not shown) of an internal combustion engine.

Furthermore, a helical spring 8 is provided which on the one hand is supported on the base plate 7 and which on the other engages with the eccentric 3.

The shaft 6 is provided with a central longitudinal bore hole 9 through which a screw 10 is passed. The screw 10 engages in its thread segment 11 into a tapped hole of the motor block (not shown). On the other end of the bolt 6 a disk 12 is arranged rotatably on a ledge 13 of the shaft. The disk 12 projects generally axially so that it can be clamped between a screw head 14 of screw 10 and the shaft 6 when screw 10 is tightened. The clamping brings it about that disk 12 is connected friction-locking with shaft 6.

Furthermore, a pin 15 is provided which locks the disk 12, the eccentric 3 and the support 3 with one another. For this reason, the base plate 7 of the support 4, the eccentric 3 and the disk 12 have in each case a hole 16, 17, 18 through which the pin 15 is passed. The helical spring 8 is prestressed in the representation shown.

Figure 2:
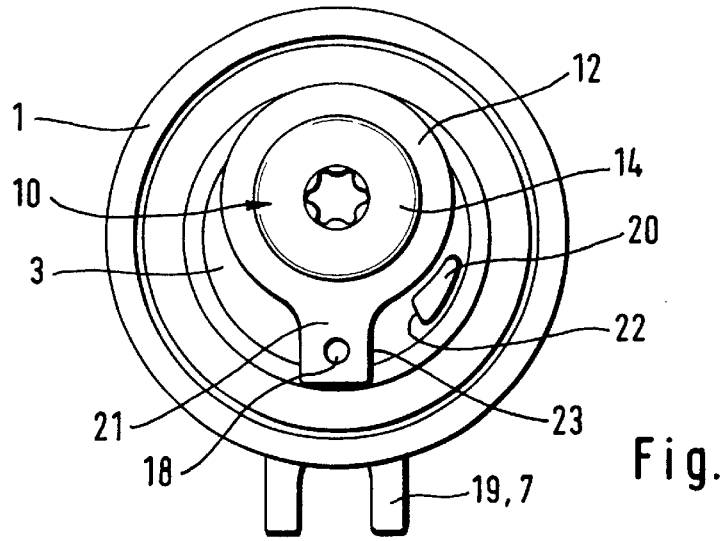
FIG. 2 is an elevational view of the tensioning device of FIG. 1 looking toward the left.

From FIG. 2, it can be inferred that base plate 7 has a fork-like end 19 which is provided for engagement with a motor block (not shown). Furthermore, it is to be gathered from this representation that the eccentric 3 is provided with a raised projection 20 which at least partially overlaps with the disk 12 in an axial direction. The disk 12 furthermore has a radially directed bar 21 which is provided with the bore hole 18 for the pin (which is not depicted in this representation). The bar 21 and the projection 20 each have an arrangement 22, 23 which are provided for striking against each other. After starting the tensioning device of the invention, a swiveling of the eccentric 3 in the direction of the stationary disk 12 is restricted by the striking of arrangements 22, 23.

Figure 3:
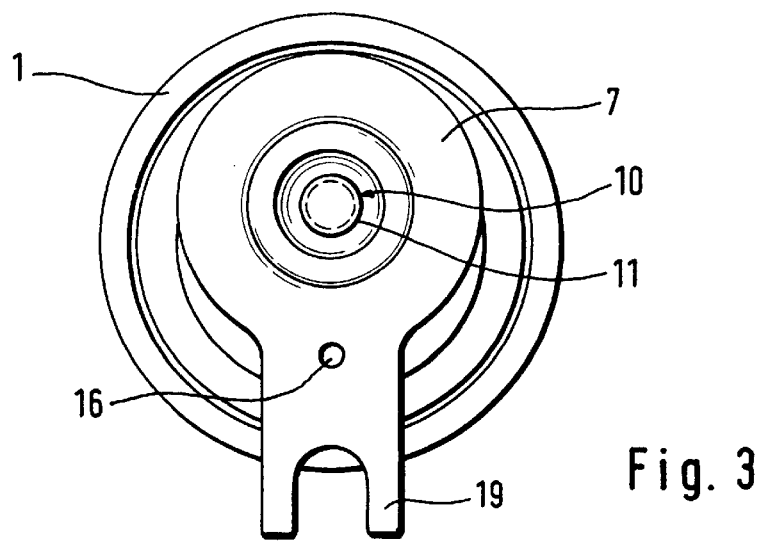
FIG. 3 is an elevational view of the tensioning device from FIG. 1 looking toward the right.

The shape of the base plate 7 is shown in FIG. 3.

The mode of action of the tensioning device of the invention will be explained below. The described, preassembled and prestressed tensioning device is installed in the toothed belt drive whereby screw 12 is tightened to such an extent that the disk 12 is still rotatable in relation to shaft 6. Now the pin 15 is moved so far axially until it has left the bore hole 16 of the base plate 7. In this situation, the eccentric 3 is swivelled together with the disk 12 under the tension force of the helical spring 8 against the not represented toothed belt and pressed on this. After concluding this swiveling process, the screw 10 is tightened fast, whereby the disk is clamped between the screw head 14 and the bolt 6. Now the disk 12 is connected friction locking with the shaft 6. Now the pin 15 is completely withdrawn, and the tensioning device of the invention is ready for operation.

Below the case is described where excessively high strand tension acts on the tensioning roller. Under this strand tension, the eccentric is swivelled against the helical spring 8, thus out of the drive. This swivelling motion is, however, restricted in that finally the raised projection 20 with its arrangement strikes against the arrangement 23 of disk 12. A further swiveling of the eccentric 3 is not possible. This swiveling path is dimensioned such that a jumping of the toothed belt is ruled out for if the excessive compressive forces are reduced, the eccentric can directly follow the toothed belt under the force of helical spring 8 so that no slippage can occur between toothed belt and toothed belt disk.

Installation errors are ruled out with the start up described. The position of the disk 12 is unambiguously established. The advantages described likewise result with a modified embodiment of the invention which is described below. With this modified embodiment, the disk 12 is connected torsion-resistant with the shaft 6. The disk 12 and the shaft 6 can also be joined with each other in one piece. In contrast, with the modified embodiment, the base plate 7 is rotatable in relation to shaft 6.

With the tensioning device illustrated, the screw 10 can be provided with a retaining ring on its free end which is supported on the screw on the one hand and on the shaft 6 on the other. In this way, the screw is not only held in the shaft safe against loss, but the axial force of the helical spring 8 is introduced through this retaining ring into screw 10.

Reference Numbers

1 Tensioning roller
2 Ball bearing
3 Eccentric
4 Support
5 Sleeve bearing
6 Shaft
7 Base plate
8 Helical spring
9 Longitudinal hole
10 Screw
11 Thread segment
12 Disk
13 Ledge
14 Screw head
15 Pin
16 Hole
17 Hole
18 Hole
20 Projection
21 Bar
22 Arrangement
23 Arrangement

What is claimed is:

1. Tensioning device for traction means, comprising a tensioning arm (3), on which a tensioning roller (1) is rotatably arranged, and with a stopper (12) which restricts a swiveling angle of the tensioning arm (3), whereby a detachable locking device (15) is provided by which the tensioning arm (3) and the stopper (12) are locked together and are jointly swivelable into an adjustable installation position for the stopper (12), wherein the tensioning arm (3) and the stopper (12) are each provided with at least one arrangement (22, 23) which are provided for striking against each other, whereby the arrangements (22, 23) of the tensioning arm (3) and stopper (12) are set at a preset distance from each other in a swiveling direction of the tensioning arm (3) in the installation position.

2. Tensioning device according to claim 1, wherein the locking device includes a pin (15) which engages in openings (16, 17, 18) of elements to be locked, whereby the pin (15) is disengageable from engagement with the openings (16, 17, 18).

3. Tensioning device according to claim 1, wherein a defined angle between the stopper and the tensioning arm in the installation position is predefined.

4. Tensioning device according to claim 1, wherein the tensioning arm (3) is pivotably arranged on a support (4), and a tension spring (8) has one end supported on the support (4) and another end supported on the tensioning arm (3).

5. Tensioning device according to claim 4, wherein the tensioning arm (3), the stopper (12) and the support (4) are lockable with one another by the locking device (15).

6. Tensioning device according to claim 4, wherein the support (4) includes a base plate (7) which is provided with a shaft (6) on which the tensioning arm (3) is pivotably arranged.

7. Tensioning device according to claim 6, wherein the shaft (6) and the base plate (7) are fastened together with each other.

8. Tensioning device according to claim 7, wherein the stopper is formed by a disk (12) which, in a first state, is rotatable in relation to the shaft (6) and, in a second state, is attachable form-locking on the shaft (6).

9. Tensioning device according to claim 8, wherein the tension spring is a helical spring (8) arranged on the shaft (6) and is supported on one end on the support (4) and on the other end on the tensioning arm which is constructed as an eccentric (3).

10. Tensioning device according to claim 9, wherein the locking device has a pin which engages in holes (16, 17, 18) of the disk (12), the eccentric (3) and the support (4).

11. Tensioning device according to claim 9, wherein a screw (10) engages into a hole (9) provided in the shaft, whereby the disk (12) is pressed on the shaft (6) and connected thereon upon the screw (10) being tightened.

12. Tensioning device according to claim 11, wherein the screw (10) is passed through the hole which is constructed as a central longitudinal hole (9) and is screwed to a frame-fast machine element.

13. Process for installing a prestressed tensioning device for a traction means drive, whereby the tensioning device comprises:

- a tensioning arm (3) on which a tensioning roller (1) is rotatably mounted,
- a support (4) on which the tensioning arm (3) is pivotably arranged,
- a tension spring (8) which is supported on the support (4) on one end and on the tensioning arm (3) on another end thereof,
- a stopper (12) which restricts a swiveling angle of the tensioning arm (3) and
- a detachable locking device (15) by which the tensioning arm (3), and the support (4) and the stopper (12) are lockable with one another, process comprising:

- locking the tensioning arm (3) and the support (4) and the stopper (12) with one another in an arrangement in which the tension spring (8) is prestressed,
- installing the tensioning device in the traction means drive,
- partially releasing the locking such that only the stopper (12) and the tensioning arm (3) are locked with each other by the locking device (15), whereby under force of the prestressed tension spring (8), the tensioning arm (3) is sprung against the traction means,
- fastening the stopper (12), and
- complete releasing of the locking such that the tensioning arm (3) is swivelable relative to the stopper (12).

* * * * *